(12) United States Patent
Freisler et al.

(10) Patent No.: US 7,712,771 B2
(45) Date of Patent: May 11, 2010

(54) AIRBAG MODULE

(75) Inventors: Werner Freisler, Aalen (DE); Matthias Schramm, Welzheim (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 11/900,126

(22) Filed: Sep. 10, 2007

(65) Prior Publication Data

US 2008/0067789 A1   Mar. 20, 2008

(30) Foreign Application Priority Data

Sep. 14, 2006   (DE) ................. 10 2006 043 162

(51) Int. Cl.
*B60R 21/16* (2006.01)
(52) U.S. Cl. ................. 280/730.1; 280/743.1
(58) Field of Classification Search ............ 280/730.1, 280/743.2, 743.1, 752
See application file for complete search history.

(56) References Cited

U.S. PATENT DOCUMENTS

| | | | |
|---|---|---|---|
| 4,842,300 A | 6/1989 | Ziomek et al. | |
| 5,918,902 A * | 7/1999 | Acker et al. | 280/743.1 |
| 6,050,600 A | 4/2000 | Yoshido | |
| 6,540,258 B1 | 4/2003 | Thomas | |
| 6,631,920 B1 * | 10/2003 | Webber et al. | 280/730.1 |

FOREIGN PATENT DOCUMENTS

| | | |
|---|---|---|
| DE | 29721678 | 3/1998 |
| DE | 19805313 | 8/1998 |
| WO | 2006/050757 | 5/2006 |

* cited by examiner

*Primary Examiner*—Faye M. Fleming
(74) *Attorney, Agent, or Firm*—Tarolli, Sundheim, Covell & Tummino LLP

(57) ABSTRACT

An airbag module has a module housing that has an airbag deployment opening with a predetermined opening dimension. An airbag is arranged folded in the module housing, the airbag having a first wall and a second wall situated opposite from the first wall. At least one holding means is arranged in the airbag. The at least one holding means is arranged in the unfolded airbag in the region of the airbag deployment opening and is attached on the airbag but not attached to the module housing. The holding means joins the first and second walls in the region of the airbag deployment opening and limits a distance between the walls in the region of the airbag deployment opening.

18 Claims, 2 Drawing Sheets

AIRBAG MODULE

FIELD OF THE INVENTION

The invention relates to an airbag module.

BACKGROUND OF THE INVENTION

Airbag modules are known with a module housing that has an airbag deployment opening with a predetermined opening dimension, and with an airbag that is arranged folded in the module housing, said airbag having a first wall and a second wall situated opposite from the first wall.

The module housing can have many different forms. In the case of knee-protection airbag modules or passenger-side airbag modules that are installed in the region of the dashboard, the module housing is usually trough-shaped and has an elongated, largely rectangular airbag deployment opening. When the airbag module is activated, gas flows out of a gas generator into the airbag while the airbag is still inside the module housing. Consequently, the side walls of the module housing are subjected to stress during the first deployment phase of the airbag. In order to prevent this from causing an expansion of the module housing, also called bulging, the module housing is often reinforced, for example, by ribs or by thicker walls.

In U.S. Pat. No. 4,842,300, in order to prevent such bulging, the opposite side walls of the module housing are joined by a tether strap located in the middle of the airbag deployment opening. This tether strap inevitably extends through the airbag as well. When the force of the inflating airbag is exerted on the housing, this force is countered by the tension of the tether strap on the housing side walls, the strap limiting the distance between the side walls.

BRIEF SUMMARY OF THE INVENTION

It is an object of the invention to provide an airbag module with a simple design with which an expansion of the housing is effectively prevented.

This object is achieved in an airbag module comprising a module housing that has an airbag deployment opening with a predetermined opening dimension. An airbag is arranged folded in the module housing, the airbag having a first wall and a second wall situated opposite from the first wall. At least one holding means is arranged in the airbag. The at least one holding means is arranged in the unfolded airbag in the region of the airbag deployment opening and is attached on the airbag but not attached to the module housing. The holding means joins the first and second walls in the region of the airbag deployment opening and limits a distance between the walls in the region of the airbag deployment opening. Since the holding means is only joined to the airbag walls, there is no need for the tedious and time-consuming affixation of the ends of the holding means to the side walls of the housing. It has been found that a holding means with an appropriately selected length in the region of the airbag deployment opening is sufficient to reliably prevent a detrimental expansion of the housing.

Preferably, due to the effect of the holding means, when the airbag is inflated, the walls are at a distance from each other in the region of the airbag deployment opening that is less than the predetermined opening dimension. If the distance between the airbag walls can be kept less than or equal to the distance between the side walls of the housing—said distance, of course, determining the opening dimension of the airbag deployment opening—then the bulging forces that are exerted by the airbag onto the housing can be minimized.

The length of the holding means is preferably shorter than the predetermined opening dimension of the housing. This ensures that the distance between the airbag walls does not become so great that bulging of the housing can occur.

Advantageously, the holding means limits the distance between the airbag walls in the region of the airbag deployment opening to the predetermined opening dimension at the maximum. It is also conceivable that a certain degree of expansion of the housing is permitted so that the resulting distance between the airbag walls in the region of the airbag deployment opening can become slightly larger than the predetermined opening dimension.

In a first embodiment of the invention, the holding means is a tether strap.

In a second embodiment of the invention, the holding means is a dart in the airbag. For this purpose, the opposite airbag walls are sewed or woven together in sections.

With the use of a tether strap as well as with the use of a dart and, by the same token, for other possible forms of the holding means, the latter can extend essentially along the entire length of the opposite walls. If the holding means has a length that approximately matches the length of the airbag deployment opening perpendicular to the predetermined opening dimension, it is ensured that no excessive forces are transmitted to the housing in the entire region of the airbag deployment opening.

Several holding means can be provided, each of which is arranged at a distance from the other. Some of the holding means could be in the form of tether straps whereas darts are provided at other places. It would also be conceivable to arrange the holding means in the region of the airbag deployment opening in such a way that their height is offset with respect to each other, for example, they are positioned above one another.

The airbag may extend to the base of the module housing. It may be attached, for instance, to the module housing via a gas generator as is known from the prior art.

The module housing is preferably essentially trough-shaped, the airbag deployment opening preferably being elongated, especially rectangular. With such a housing shape, the predetermined opening dimension matches, for example, the length of the narrow side of the airbag deployment opening.

The invention can be used advantageously with knee-protection airbag modules. Here, the risk of expansion is especially great since large-surface airbags have to be used which also have to be unfolded very quickly.

With a knee-protection airbag module that is installed in such a way that the airbag deployment opening is oriented opposite to the lengthwise direction of the vehicle, the predetermined opening dimension may match the height of the airbag deployment opening.

SHORT DESCRIPTION OF THE DRAWINGS

DETAILED DESCRIPTION OF PREFERRED EMBODIMENTS

Figure 1:
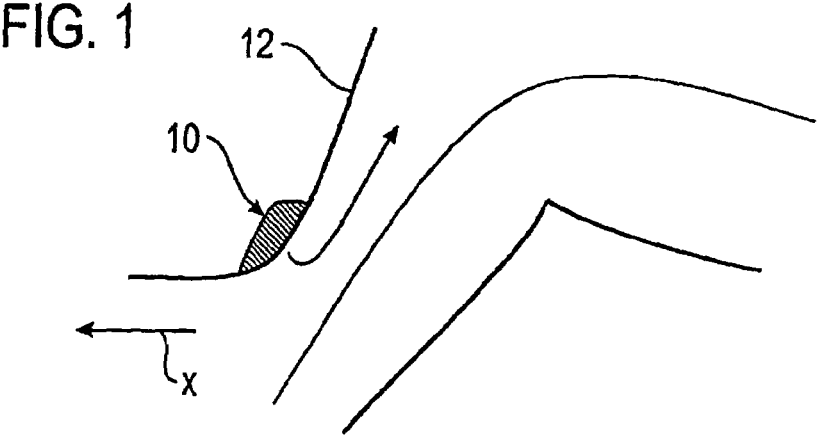
FIG. 1 shows a schematic view of an airbag module according to the invention, in the form of a knee-protection airbag module.
Figure 2:
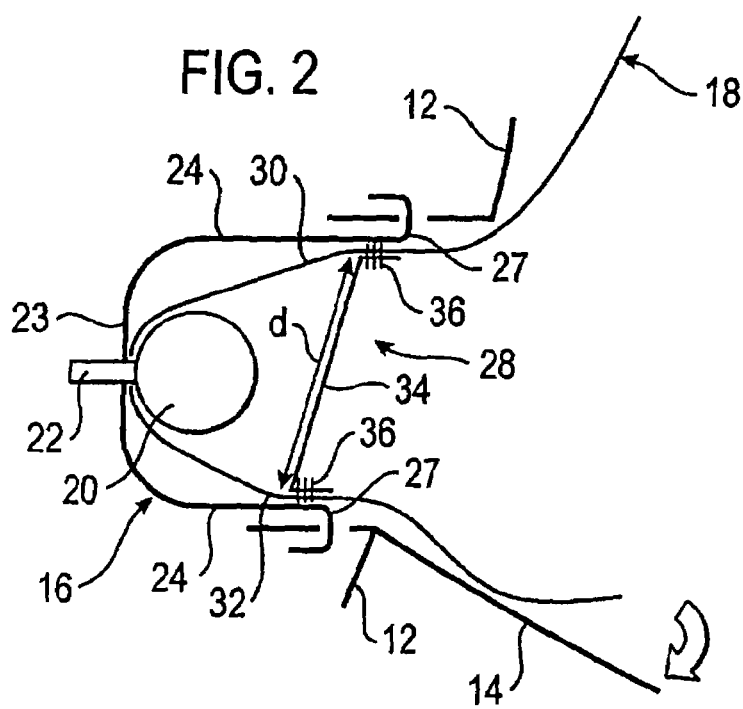
FIG. 2 shows a schematic sectional view of an airbag module installed in a vehicle, according to a first embodiment.
Figure 3:
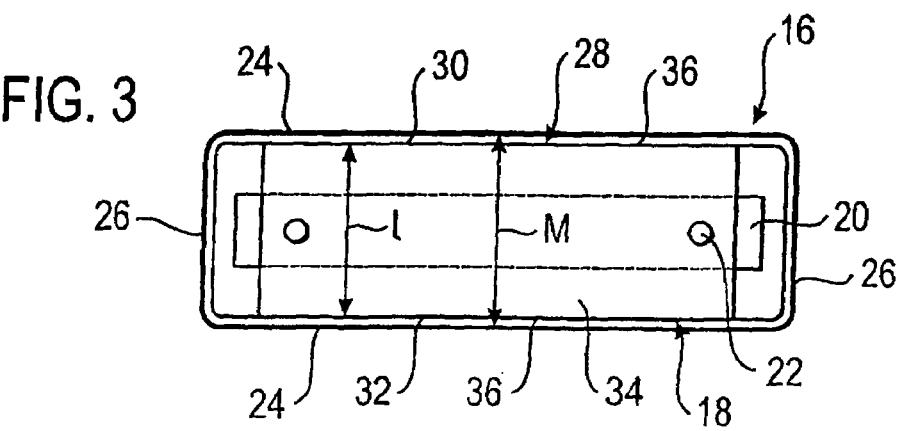
FIG. 3 shows a schematic top view of the airbag deployment opening of the airbag module in FIG. 2.

FIGS. 2 and 3 show a first embodiment of an airbag module 10, here in the form of a knee-protection airbag module that is installed in a vehicle interior lining 12 located, for example, below a steering wheel lining (see FIG. 1).

However, the airbag module 10 could also be any other suitable airbag module, for example, for protecting a passenger, or else a side-impact airbag module that is accommodated in a backrest of a vehicle seat. In this case, the part of the vehicle interior lining 12 shown in FIG. 2 would be any other suitable part of the vehicle.

Before the airbag module 10 is activated, it is concealed behind a covering flap 14 formed in the vehicle interior lining 12, said covering flap 14 being opened when the airbag module 10 is activated.

The airbag module 10 comprises a trough-shaped module housing 16 having two opposite side walls 24 followed by two adjacent narrow sides 26. Together with the base 23, the side walls 24 and the narrow sides 26 form a trough-shaped recess in which a folded airbag 18 and a gas generator 20 are accommodated. The outer edges 27 of the side walls 24 and the narrow sides 26 limit an airbag deployment opening 28 through which the airbag 18 exits from the module housing 16 when the airbag module 10 is activated.

The airbag deployment opening 28 has a predetermined opening dimension M that essentially matches the distance between the side walls 24 and thus, in the case of the rectangular trough-shaped module housing 16 shown, the length of the narrow side 26, in an unstressed state of the module housing 16. Since the airbag module 10 in the example shown here is installed in such a way that the airbag deployment opening 28 is oriented essentially perpendicular to the vehicle lengthwise direction x (see FIG. 1), the predetermined opening dimension M also matches the height of the airbag deployment opening 28.

The module housing 16 can be made of metal or of a suitable plastic.

In the example shown, the gas generator 20 is an elongated tubular gas generator that is connected to the module housing 16 by means of radially projecting fastening bolts 22. The entire airbag module 10 is attached to the vehicle by means of the fastening bolts 22.

The airbag 18 runs to the base 23 of the module housing 16 and is attached there by the gas generator 20 arranged in the airbag.

However, the gas generator 20 could also be arranged outside of the module housing 16.

When the airbag module 10 is activated, it should be prevented that, during the first unfolding phase of the airbag 18, the module housing 16 bulges and the airbag deployment opening 28 is deformed so that the distance between the side walls 24 considerably exceeds the predetermined opening dimension M.

In order to ensure this, a holding means 34 is provided between a first wall 30 and an opposite second wall 32 of the airbag 18, said walls 30, 32 running essentially along the side walls 24 of the module housing 16 and parallel thereto when the airbag 18 is inflated, this holding means 34 being directly and permanently attached, for example, by sewing (reference numeral 36) to the two walls 30, 32 of the airbag 18 in the region of the airbag deployment opening 28. The holding means 34, which is in the form of a tether strap in the first embodiment, is only attached to the airbag walls 30, 32 but not to the module housing 16.

The holding means 34 is arranged in the region of the airbag deployment opening 28 in immediate vicinity to the airbag deployment opening 28 and as close as possible to the upper edge 27 of the side walls 24 of the module housing 16. In the example shown here, the holding means 34 is still inside the module housing 16.

In the region of the airbag deployment opening 28 the airbag 18 forms a circumferentially closed flow channel that is limited towards the outside by its walls 30, 32.

In the example shown, the holding means 34, that is to say, the tether strap, extends along most of the dimension of the side walls 24 perpendicular to the predetermined opening dimension M. This is shown in FIG. 3. In the top view, the tether strap almost completely fills the airbag deployment opening 28. The dimensions should, of course, be selected in such a way as not to hinder the gas flow from the gas generator 20 into the rest of the airbag 18.

The tether strap is preferably made of a fabric, for example, of a fabric similar to that of the airbag 18.

As an alternative, several narrower tether straps or just one narrower tether strap could be provided.

The length I of the holding means 34 parallel to the predetermined opening dimension M (that is to say, also parallel to the narrow sides 26 in this example) is selected to be slightly shorter or, at the maximum, as long as the size of the predetermined opening dimension M.

The airbag 18 is folded in such a way that most of the airbag 18 forms a packet that lies on the holding means 34.

When the airbag module 10 is activated, gas flows out of the gas generator 20 into the airbag 18 that is still folded in the module housing 16, the gas flowing first into the section of the airbag 18 between the gas generator 20 and the holding means 34. After a short time, the airbag 18 pushes the covering flap 14 open and the airbag 18 starts deploy out of the module housing 16 into the interior of the vehicle. The holding means 34 moves into the region of the airbag deployment opening 28 and pushes the rest of the airbag packet in front of it and out of the module housing 16 through the airbag deployment opening 28.

Owing to the holding means 34, the distance d between the airbag walls 30, 32 in the region of the airbag deployment opening 28 inside the module housing 16 is limited to a value that is just below or, at the maximum, just above the size of the predetermined opening dimension M. This prevents an excess transmission of force into the module housing 16 and thus an expansion of the airbag deployment opening 28 perpendicular to the side walls 24.

Figure 4:
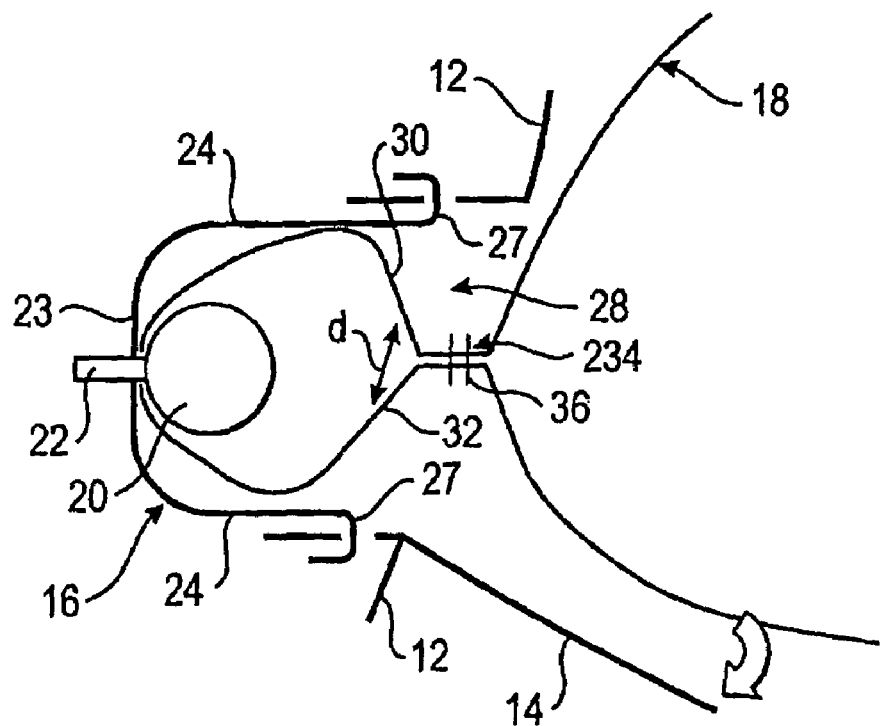
FIG. 4 shows a schematic sectional view of an airbag module installed in a vehicle, according to a second embodiment.
Figure 5:
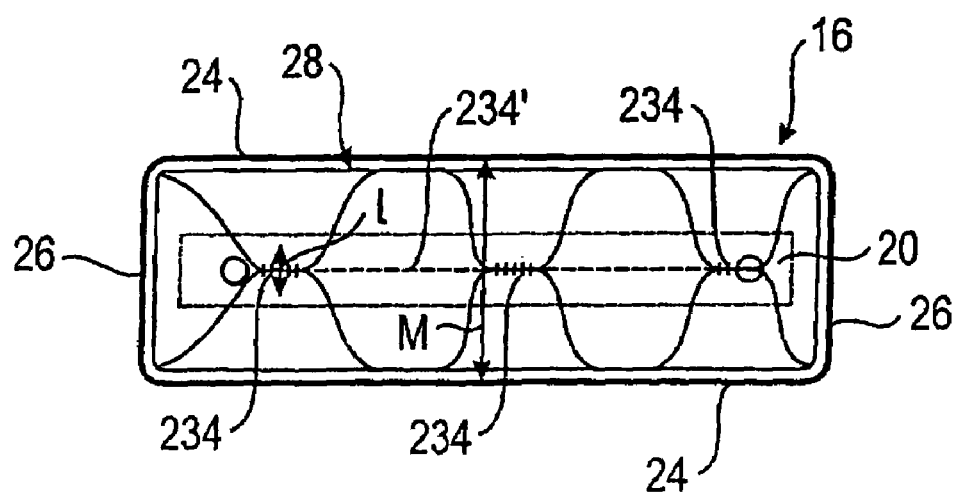
FIG. 5 shows a schematic top view of the airbag deployment opening of the airbag module in FIG. 4.

The second embodiment shown in FIGS. 4 and 5 differs from the embodiment described above by the form of the holding means.

The holding means 234 here is formed by one or more darts that join the two walls 30, 32 of the airbag 18 to each other in the region of the airbag deployment opening 28 in the immediate vicinity of the airbag deployment opening 28. The darts can be configured in such a way that the walls 30, 32 lie directly on each other so that the holding means 234 has a hypothetical length of zero, but it would also be possible for the darts to leave a gap of up to a few centimeters between the airbag walls 30, 32 so that the holding means 234 would have a length corresponding to the gap.

FIG. 4 shows three individual darts arranged next to each other. However, it would also be possible to provide just one single dart 234' that extends perpendicular to the predetermined opening dimension M along the entire airbag deployment opening 28, similar to the tether strap in the example described above.

Like in the first embodiment, the holding means 234 limits the distance d between the walls 30, 32 of the airbag 18 in the region of the airbag deployment opening 28 to a value that is less than or, at the maximum, slightly larger than the predetermined opening dimension M.

Of course, it is also possible to attach other types of holding means in the airbag 18.

Moreover, various types of holding means can be combined and several holding means of different types could be used at the same time. It would also be conceivable to use the holding means arranged one above the other, that is to say, arranged one behind the other in the direction from the base 23 of the module housing 16 towards the airbag deployment opening 28.

The holding means 34, 234 can also fulfill the function of guiding the gas as well as the function of serving as heat protection for the airbag 18 against the gas flowing out of the gas generator 20.

Especially for knee-protection airbags that, as shown in FIG. 1, are supposed to unfold in an arc upwards, the holding means 34, 234 can also be used in a third function in order to help define the deployment behavior and the shape of the airbag 18 in its inflated state.

For this purpose, it is possible, as indicated in FIG. 1, to effectuate the attachment 36 of the holding means 34 to the airbag walls 30, 32 at differing distances from the base 23 of the module housing 16 in order to use the asymmetrical installation to influence the position of the airbag 18 in its inflated state.

The asymmetry, as shown here, can coincide with different lengths of the side walls 24 of the module housing 16, but can also be attained independently thereof.

The invention claimed is:

1. An airbag module comprising:
a module housing (16) having an airbag deployment opening (28) with a predetermined opening dimension (M) measured between opposing side walls (24) of the housing (16),
an airbag (18) that is arranged folded in the module housing (16), said airbag having a first wall (30) and a second wall (32) situated opposite from the first wall, and
at least one holding means (34; 234) arranged in the airbag (18),
the at least one holding means (34; 234) being arranged in the unfolded airbag (18) in the region of the airbag deployment opening (28) and being attached on the airbag (18) but not attached to the module housing (16), the holding means (34; 234) joining the first and second walls (30, 32) in the region of the airbag deployment opening (28) and limiting a distance (d) between the walls (30, 32) in the region of the airbag deployment opening (28) to the predetermined opening dimension (M) at the maximum.

2. The airbag module according to claim 1, wherein the walls (30, 32) are at a distance (d) from each other in the region of the airbag deployment opening (28) that is less than the predetermined opening dimension (M).

3. The airbag module according to claim 1, wherein the length (l) of the holding means (34; 234) is shorter than the predetermined opening dimension (M).

4. The airbag module according to claim 1, wherein the holding means (34) is a tether strap.

5. The airbag module according to claim 1, wherein the holding means (234) is a dart in the airbag (18).

6. The airbag module according to claim 1, wherein the holding means (34; 234) extends essentially along the entire length of the opposite walls (30, 32).

7. The airbag module according to claim 1, wherein several holding means (34; 234) are provided.

8. The airbag module according to claim 1, wherein the airbag (18) extends to the base of the module housing (16).

9. The airbag module according to claim 1, wherein the airbag (18) is attached to the module housing (16) via a gas generator (20).

10. The airbag module according to claim 1, wherein the module housing (16) is essentially trough-shaped.

11. The airbag module according to claim 1, wherein the airbag deployment opening (28) is elongated.

12. The airbag module according to claim 1, wherein the predetermined opening dimension (M) matches a length of a narrow side (26) of the airbag deployment opening (28).

13. The airbag module according to claim 1, wherein the airbag module (10) is a knee-protection airbag module.

14. The airbag module according to claim 1, wherein the predetermined opening dimension (M) matches a height of the airbag deployment opening (28).

15. An airbag module comprising:
a module housing (16) having an airbag deployment opening (28) with a predetermined opening dimension (M) measured between opposing side walls (24) of the housing (16),
an airbag (18) that is arranged folded in the module housing (16), said airbag having a first wall (30) and a second wall (32) situated opposite from the first wall, and
at least one holding means (34) being a tether strap arranged in the airbag (18),
the at least one holding means (34) being arranged in the unfolded airbag (18) in the region of the airbag deployment opening (28) and being attached on the airbag (18) but not attached to the module housing (16), the holding means (34) joining the first and second walls (30, 32) in the region of the airbag deployment opening (28) and limiting a distance (d) between the walls (30, 32) in the region of the airbag deployment opening (28) to the predetermined opening dimension (M) at the maximum.

16. An airbag module comprising:
a module housing (16) having two opposite side walls (24) and an airbag deployment opening (28) with a predetermined opening dimension (M) substantially equal to the distance between the side walls (24),
an airbag (18) that is arranged folded in the module housing (16), said airbag having a first wall (30) and a second wall (32) situated opposite from the first wall, and
at least one holding means (34; 234) arranged in the airbag (18),
the at least one holding means (34; 234) being arranged in the unfolded airbag (18) in the region of the airbag deployment opening (28) and being attached on the airbag (18) but not attached to the module housing (16), the holding means (34; 234) joining the first and second walls (30, 32) in the region of the airbag deployment opening (28) and limiting a distance (d) between the walls (30, 32) in the region of the airbag deployment opening (28) to the predetermined opening dimension (M) at the maximum,
the holding means (34, 234) extending essentially along the entire length of the opposite side walls (24).

17. An airbag module comprising:

a module housing (16) having two opposite side walls (24) followed by two adjacent narrow sides (26) and an airbag deployment opening (28) with a predetermined opening dimension (M) substantially equal to the length of said narrow sides (26), an airbag (18) that is arranged folded in the module housing (16), said airbag having a first wall (30) and a second wall (32) situated opposite from the first wall, and at least one holding means (34; 234) arranged in the airbag (18), the at least one holding means (34; 234) being arranged in the unfolded airbag (18) in the region of the airbag deployment opening (28) and essentially in the middle between the narrow sides (26) and being attached on the airbag (18) but not attached to the module housing (16), the holding means (34; 234) joining the first and second walls (30, 32) in the region of the airbag deployment opening (28) and limiting a distance (d) between the walls (30, 32) in the region of the airbag deployment opening (28) to the predetermined opening dimension (M) at the maximum.

18. An airbag module comprising:

a module housing (16) having an airbag deployment opening (28) with a predetermined opening dimension (M) measured between opposing side walls (24) of the housing (16), an airbag (18) that is arranged folded in the module housing (16), said airbag having a first wall (30) and a second wall (32) situated opposite from the first wall, and at least one holding means (34; 234) arranged in the airbag (18), the at least one holding means (34; 234) being arranged in the unfolded airbag (18) in the region of the airbag deployment opening (28), the length (I) of the holding means (34, 234) parallel to the predetermined opening dimension (M) being slightly shorter or, at the maximum, as long as the size of the predetermined opening dimension (M), the at least one holding means (34; 234) being attached on the airbag (18) but not attached to the module housing (16), the holding means (34; 234) joining the first and second walls (30, 32) in the region of the airbag deployment opening (28) and limiting a distance (d) between the walls (30, 32) in the region of the airbag deployment opening (28) to the predetermined opening dimension (M) at the maximum.

\* \* \* \* \*